United States Patent

Okada et al.

[11] Patent Number: 6,009,309
[45] Date of Patent: *Dec. 28, 1999

[54] METHOD OF OPERATION A COMBINATION RADIOTELEPHONE AND PAGING DEVICE AND METHOD OF OPERATION

[75] Inventors: Tomoyuki Okada, Palatine; Anthony John Bogusz, Harwood Heights; Steve G. Friede, Wauconda; Thomas C. Sanchez, Schaumburg, all of Ill.

[73] Assignee: Motorola, Inc., Schaumburg, Ill.

[ * ] Notice: This patent is subject to a terminal disclaimer.

[21] Appl. No.: 08/895,643

[22] Filed: Jul. 17, 1997

Related U.S. Application Data

[63] Continuation of application No. 08/511,348, Aug. 4, 1995, abandoned, which is a continuation of application No. 08/058,520, May 4, 1993, Pat. No. 5,526,398.

[51] Int. Cl.⁶ ........................................ H04Q 7/32
[52] U.S. Cl. .................. 455/31.3; 455/343; 379/210; 307/11; 340/636
[58] Field of Search ................... 455/31.3, 343; 379/210; 307/11; 340/636

[56] References Cited

U.S. PATENT DOCUMENTS

| | | | |
|---|---|---|---|
| 3,740,569 | 6/1973 | Carcia | 307/11 |
| 4,575,582 | 3/1986 | Mekino . | |
| 4,747,122 | 5/1988 | Bhagat et al. . | |
| 5,040,204 | 8/1991 | Sasaki et al. | 379/61 |
| 5,042,082 | 8/1991 | Dahlin . | |
| 5,054,052 | 10/1991 | Nonami . | |
| 5,109,400 | 4/1992 | Patsiokas et al. . | |
| 5,117,449 | 5/1992 | Metroka et al. . | |
| 5,148,473 | 9/1992 | Freeland et al. . | |
| 5,153,903 | 10/1992 | Eastmond et al. . | |
| 5,175,758 | 12/1992 | Levanto et al. . | |
| 5,239,286 | 8/1993 | Komatsuda | 340/636 |
| 5,247,700 | 9/1993 | Wohl et al. | 455/33.1 |
| 5,289,524 | 2/1994 | Takaro et al. | 379/57 |
| 5,307,399 | 4/1994 | Dai et al. . | |
| 5,392,452 | 2/1995 | Davis . | |
| 5,430,363 | 7/1995 | Kim | 320/14 |
| 5,438,701 | 8/1995 | Yamada et al. | 455/89 |
| 5,481,590 | 1/1996 | Grimes | 379/210 |
| 5,495,517 | 2/1996 | Ide et al. | 379/57 |
| 5,526,401 | 6/1996 | Roach, Jr. et al. . | |
| 5,541,976 | 7/1996 | Ghisler | 455/343 |
| 5,542,115 | 7/1996 | Wong et al. . | |
| 5,613,199 | 3/1997 | Yahagi . | |
| 5,636,426 | 6/1997 | Nyhart . | |

FOREIGN PATENT DOCUMENTS

| | | |
|---|---|---|
| 62-56520 | 9/1988 | Japan . |
| 5-14258 | 1/1993 | Japan . |
| 2243746 | 11/1991 | United Kingdom . |

OTHER PUBLICATIONS

"Cellular Pager"; Focarile et al; Reg. #H610; Published Mar. 7, 1989; US Statutory Inven. Registration.

*Primary Examiner*—William Cumming
*Attorney, Agent, or Firm*—John J. Oskorep; Brian M. Mancini

[57] ABSTRACT

A combined radiotelephone and paging device (101), hereinafter the combined unit, normally operates as a radiotelephone. In response to a predetermined condition, the combined unit operates as a paging device. The predetermined conditions include low battery voltage and poor communication channel quality or a request signal from a remote transceiver (109) of the radiotelephone system. The paging system and the radiotelephone system may be independent communication systems or they may be a single communication system. The combined unit (101) and its unique switching characteristics allows the combined unit (101) to utilize the paging devices beneficial qualities of lower power consumption and broader service range to enhance the usefulness of a radiotelephone.

24 Claims, 4 Drawing Sheets

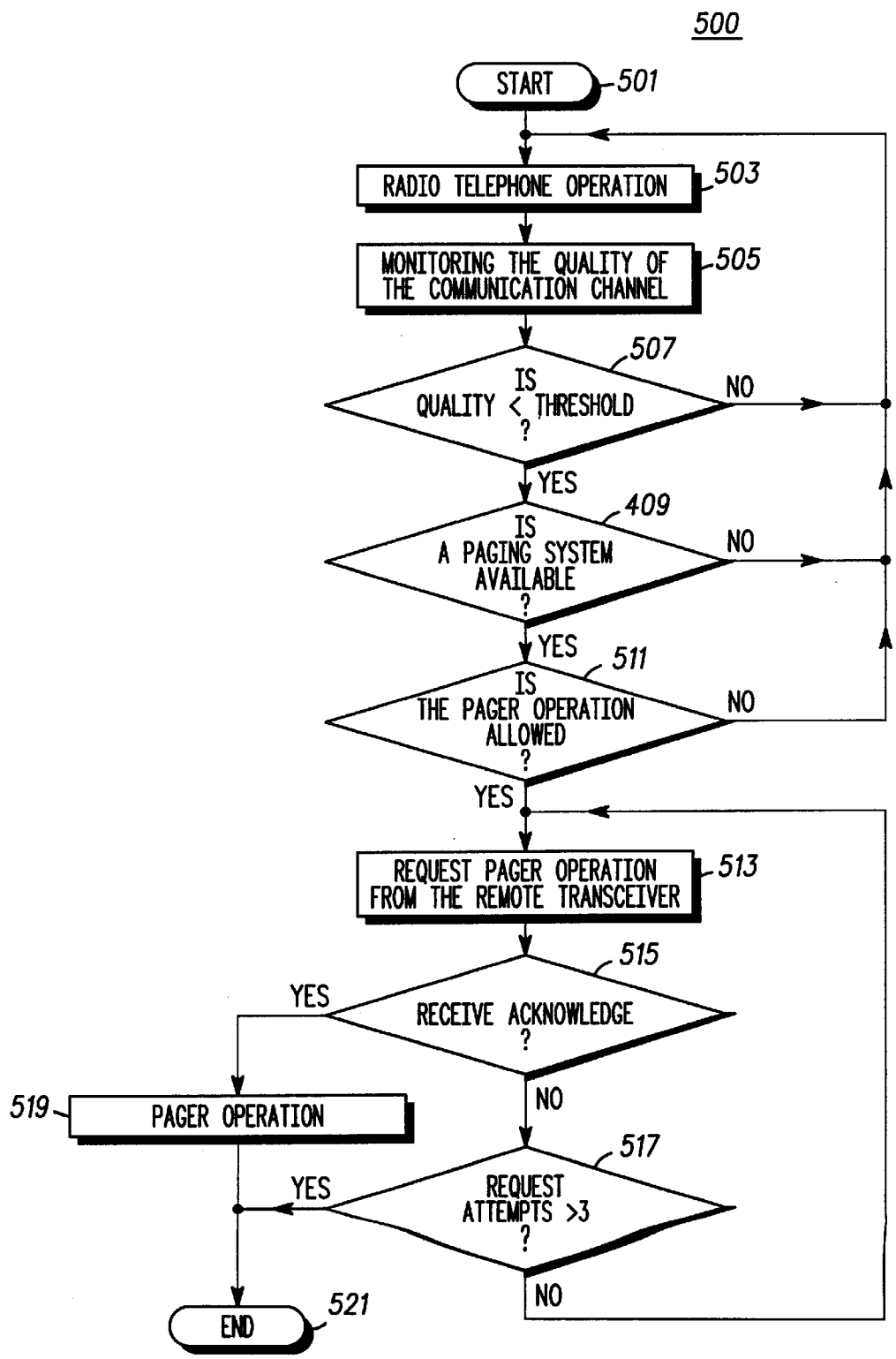

METHOD OF OPERATION A COMBINATION RADIOTELEPHONE AND PAGING DEVICE AND METHOD OF OPERATION

This is a continuation of application Ser. No. 08/511,348, filed Aug. 4, 1995, abandoned, which is a continuation of application Ser. No. 08/058,520, filed May 4, 1993, now U.S. Pat. No. 5,526,398.

FIELD OF THE INVENTION

This invention generally relates to combination radiotelephones and paging devices and more specifically to operating a combination radiotelephone and paging device as a paging device in response to predetermined conditions. The predetermined conditions include but are not limited to an indication from a remote transceiver, a voltage level of the power supply falling below a predetermined threshold, and the radiotelephone going beyond a radiotelephone coverage area.

BACKGROUND OF THE INVENTION

Both paging systems and radiotelephone systems are widely used forms of communication. Recently, combinations of radiotelephones and paging devices have been developed.

The paging system is typically a one-way radio communication system. An individual wishing to contact someone with a paging device usually calls a central telephone number to access the central paging control. Then, the caller keys in the number assigned to the individual paging device they wish to reach. Once the paging device is accessed, the caller can either leave a voice message for the paged individual or key in the telephone number to be displayed on the paging device's display. Some systems may also allow both types of paging.

Paging devices typically consume less power than radiotelephones. First, a paging device only receives radio frequency (RF) signals, it does not transmit RF signals like a radiotelephone. Second, paging systems typically operate at lower RF than a radiotelephone system. The lower RF operation allows the paging device to employ more efficient receiver circuitry, thus, less power consumption.

Additionally, a paging system's service coverage area is typically broader than a radiotelephone system's coverage area. Due to the configuration of a paging system, a paging system's remote transmitter operates at a higher power level than a radiotelephone system's remote transceiver. Thus, paging service is often available where radiotelephone service is not available.

The radiotelephone system typically allows two-way communication. The radiotelephone allows the user to access the landline telephone system to send and receive two-way telephone conversations. A radiotelephone system is often limited in its scope of geographic coverage; leaving the radiotelephone user without communication service in certain areas.

Powering a portable radiotelephones creates an additional problem. A portable radiotelephone requires a portable power source, usually provided by rechargeable battery packs. A RF transmitter requires more power than a RF receiver, leaving the transmitter inoperable sooner than the receiver in a portable radiotelephone.

The use of a combination radiotelephone and paging device is a recently developed idea. Typically, the combination allows a user to choose between receiving phone calls or receiving pages, dependent only upon the users preference. It would be desirable for a combination radiotelephone and paging device to utilize a paging device's beneficial qualities of lower power consumption and broader service range to enhance the usefulness of a radiotelephone.

BRIEF DESCRIPTION OF THE DRAWINGS

FIG. 5 is a process flow chart illustrating a method of operating the combined unit in accordance with the present invention.

DESCRIPTION OF A PREFERRED EMBODIMENT

Figure 1:
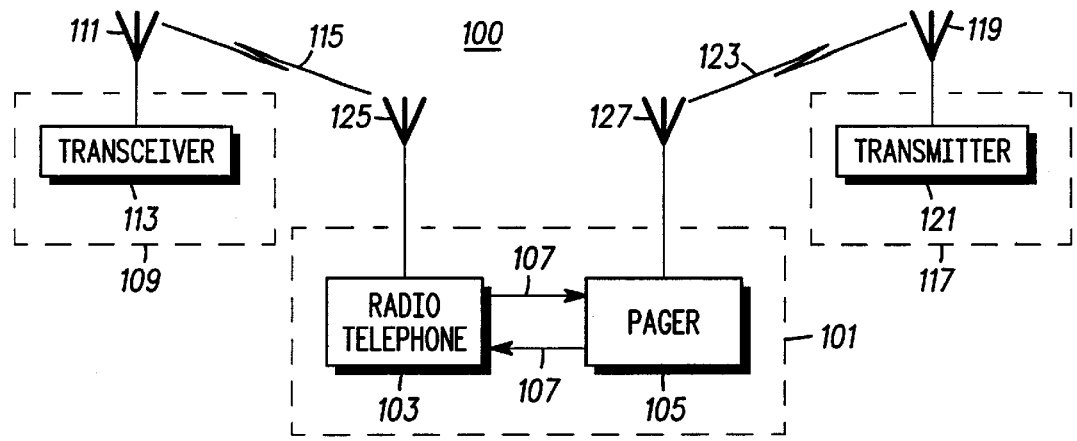
FIG. 1 is an illustration in block diagram form of a radiotelephone and paging system in accordance with the present invention.

FIG. 1 is a block diagram of a radiotelephone and paging system in accordance with a first embodiment of the present invention. The combined radiotelephone and paging device 101 is capable of communication with a radiotelephone system's remote transceiver 109 and with the paging system's remote transmitter 117. The remote transceiver 109 and the remote transmitter 117 may or may not share the same physical location. Their location and details of their operation are not of concern to the present invention and are well known in the art of communications.

In the radiotelephone system, the remote transceiver 109 sends and receives radio frequency (RF) signals to and from mobile and portable radiotelephones contained within a first geographic area served by the remote transceiver 109. The radiotelephone 103 is one such radiotelephone served by the remote transceiver 109. The RF signals sent and received between the radiotelephone 103 and the remote transceiver 109 form a full duplex communication channel 115.

In the paging system, the remote transmitter 117 sends RF signals to paging devices, also known as pagers, within a second geographic area served by the remote transmitter 117. The paging device 105 is one such paging device served by the remote transmitter 117. The RF signals 123 sent to the paging device 105 typically contain information that may be displayed on the paging unit 105. This information includes telephone numbers and short messages.

The second geographic area of the paging system is independent of the first geographic area of the radiotelephone system. The geographic area served by a remote transmitter of a paging system is typically much larger than the geographic area served by a remote transceiver of a radiotelephone system. For the purposes of the first embodiment of the present invention it is assumed that there is paging service available in areas not served by a radiotelephone system.

Figure 2:
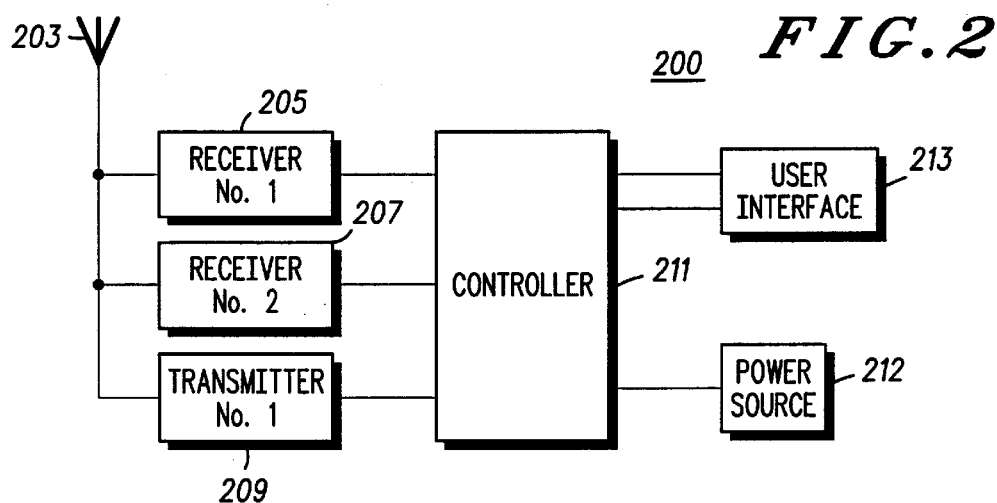
FIG. 2 is an illustration in block diagram form of a first embodiment of a combined radiotelephone and paging device (hereinafter a combined unit) in accordance with the present invention.
Figure 7:
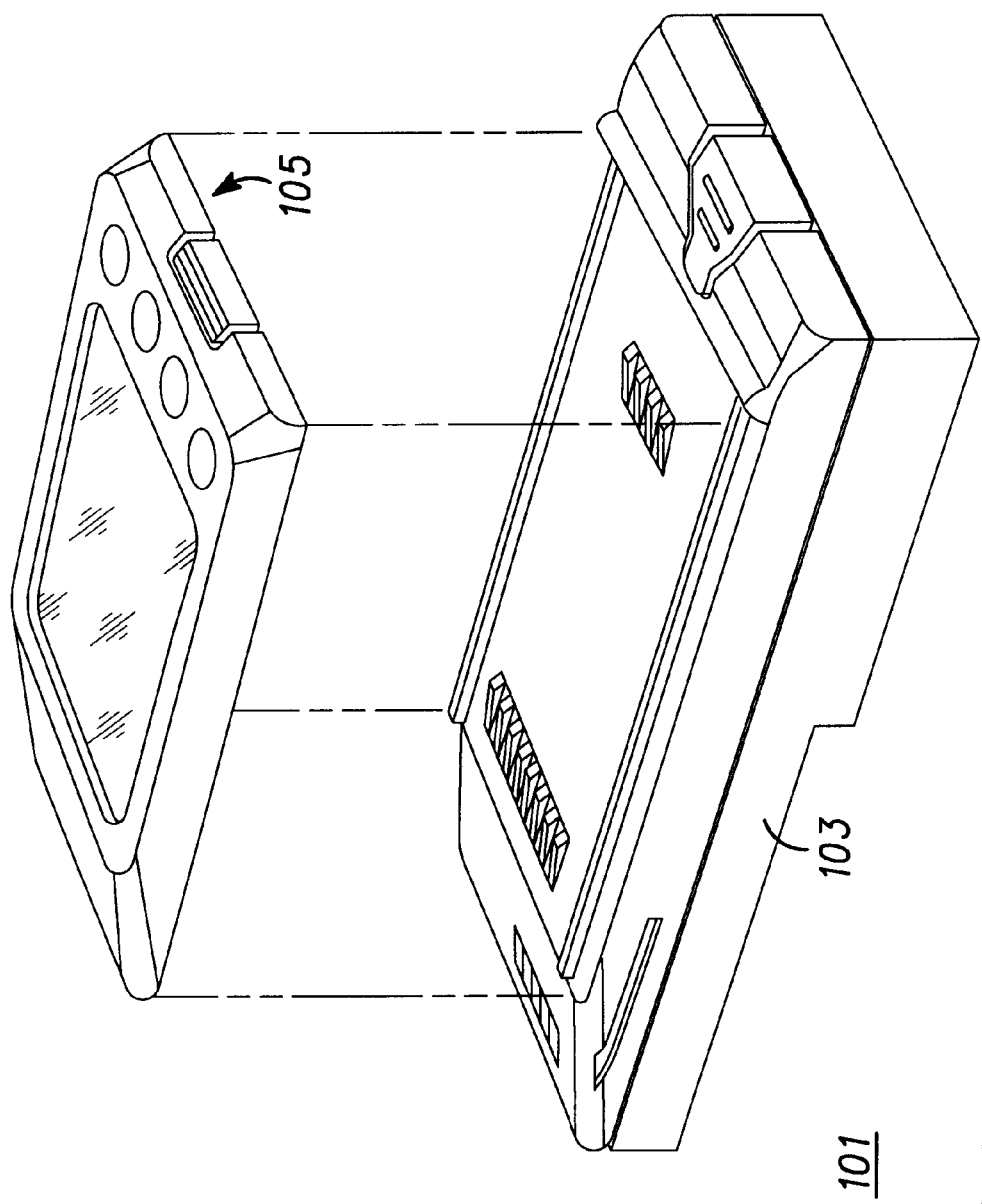
FIG. 7 is a exploded perspective view of an attachable radiotelephone and pager in accordance with the present invention.

The combined radiotelephone and paging device 101 may have a removable independent paging device 105 electrically and mechanically connected to the radiotelephone 103 through a connector or interface 107 using connection techniques known in the art as shown in FIG. 7 or, as in the preferred embodiment, the paging device may be integrated into the radiotelephone. FIG. 2 is an illustration in block diagram form of a combined radiotelephone and paging device 200 (hereinafter a combined unit 200) in accordance with the present invention. By integrating the radiotelephone and the paging device the cost of the combined radiotelephone and paging device may be reduced by sharing common platforms such as the user interface 213 and the antenna 203. Additionally, a receiver may be shared, depending on the design of the receiver and the operating frequency of the paging system and the radiotelephone system. The power source 212 provides power to the combined unit 200. In the case of a portable combined unit 200, the power source 212 is typically a rechargeable battery pack containing nickel metal hydride or nickel cadium cells.

While receiving signals from the remote transceiver 109, the combined unit 200 uses the antenna 203 to couple an RF signal and convert the RF signal into an electrical RF signal. The electrical RF signal is used within the receiver1 205. The receiver1 105 is a well known receiver; the type of receiver which operates at the RF common to radiotelephones. In the preferred embodiment, the receiver1 205 of the combined unit 200 receives electrical RF signals in the range of 869 MHz to 894 MHz. The receiver1 205 contains an IF circuit and a phase demodulator. The receiver1 205 outputs a symbol signal for use by the controller 211. The controller 211 formats the symbol signal into voice or data for use by the user interface 213. In the preferred embodiment, the controller 211 contains a microprocessor such as an MC68332, available from Motorola, Inc. The user interface 213 includes a microphone, a speaker, a display, and a keypad.

Upon the transmission of RF signals from the combined unit 200 to the remote transceiver 109, the controller 211 formats the voice and/or data signals received from the user interface 213. The formatted signals are input into the transmitter1 209. The transmitters 209 converts the formatted signals into electrical RF signals. The electrical RF signals are converted into RF signals and output by antenna 203. In the preferred embodiment, the transmitters 209 generates electrical RF signals of 824–849 MHz. The RF signals are received by the remote transceiver 109 via antenna 111.

Upon reception of RF signals from the paging system's remote transmitter 117, the combined unit 200 uses the antenna 203 to couple an RF signal and convert the RF signal into an electrical RF signal. The electrical RF signal is used within the receiver2 207. The receiver2 207 is a well known receiver; the type of receiver which operates at the RF common to paging systems. In the preferred embodiment, the receiver2 207 receives electrical RF signals in the range from 150–174 MHz. The receiver2 207 contains an IF circuit and a phase demodulator. The receiver2 207 outputs a symbol signal for use by the controller 211. The controller 211 formats the symbol signal into voice or data for the user interface 213.

Figure 3:
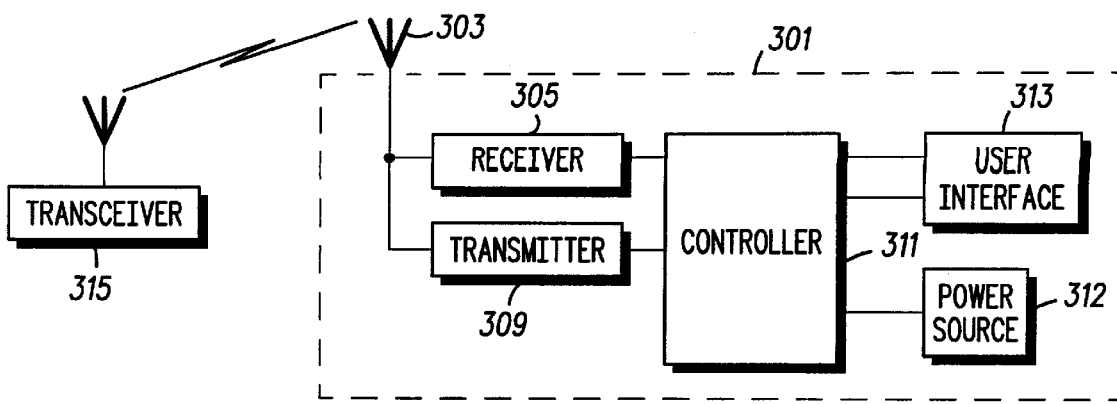
FIG. 3 is an illustration in block diagram form of a second embodiment of a combined radiotelephone and paging device (hereinafter a combined unit) in accordance with the present invention.

FIG. 3 is a block diagram of a radiotelephone system having a paging mode in accordance with a second embodiment of the present invention. In the second embodiment, the radiotelephone system operates as both a radiotelephone and paging system. Normally, the radiotelephone system operates as explained previously, the remote transceiver 315 sends and receives RF signals to the radiotelephone 301, (also referred to as combined unit 301). In response to a request signal from the radiotelephone 301 or a request by the remote transceiver 315, the radiotelephone system enters a paging mode concerning communications with the radiotelephone 301. The paging mode operates as the paging system described previously. During operation of the paging mode for the radiotelephone 301, the remote transmitter 315 may continue to service other radiotelephones within its geographic service area as fully functioning radiotelephones. The power source 312 provides power to the combined unit 301. The power source 312 provides the power at a certain voltage level. When the combined unit 301 is portable, the power source 312 is typically a rechargeable battery pack containing nickel metal hydride or nickel cadium cells. As the battery pack wears out, the voltage level provided to the combined unit 301 decreases.

Figure 4:
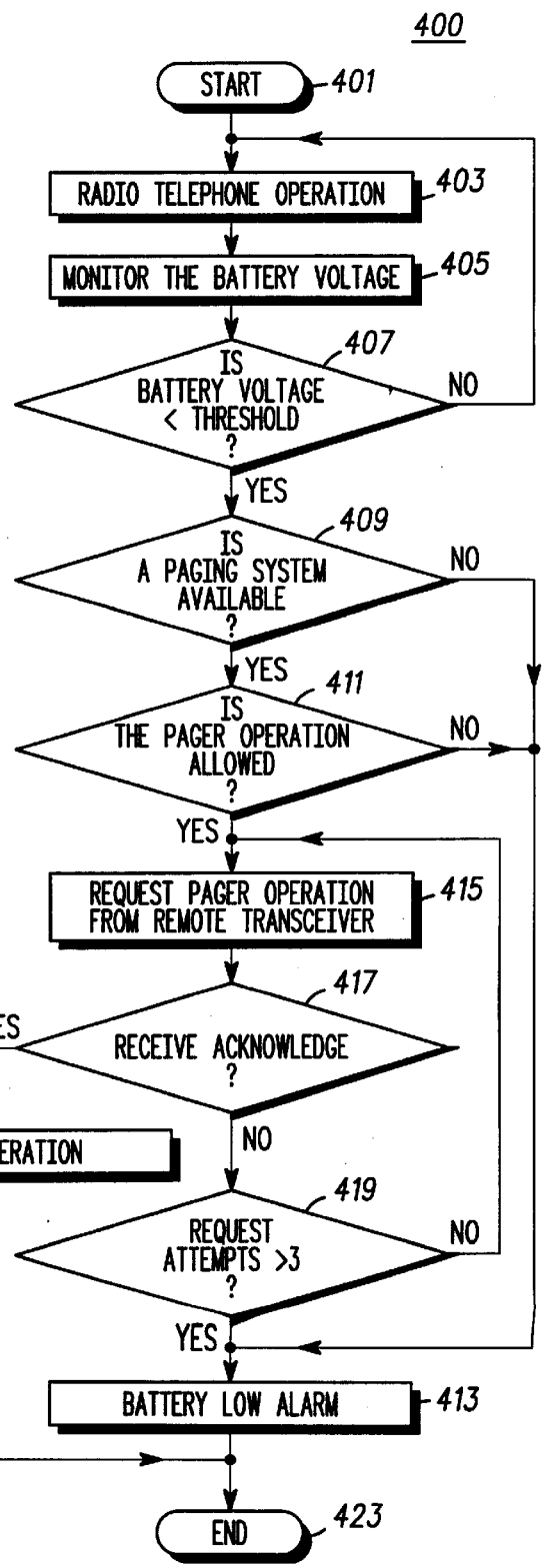
FIG. 4 is a process flow chart illustrating a method of operating the combined unit in accordance with the present invention.

FIG. 4 is a process flow chart illustrating a method of operating a combined unit such as combined unit 200 of FIG. 2 or the combined unit 301 of FIG. 3. This method would be employed in the controller of the respective units. This method may be implemented in a combined unit independent or in conjunction with the methods of FIG. 5 and FIG. 6.

First, as indicated by function block 403, the combined unit operates as a radiotelephone. Second, as indicated by function block 405, the controller monitors the voltage level of the power source to create a voltage level value. Third, as indicated by decision block 407, the voltage level value is compared to a predetermined threshold. The threshold is set to a voltage at which the paging receiver will operate while the transmitter is on the threshold of non-operation. However, it is still necessary for the transmitter to properly send a request signal to the remote transceiver. To determine the exact threshold voltage of a specific combined unit will require some experimentation. Typically, the voltage level threshold is equal to 15% less than full voltage level. In the preferred embodiment, the full voltage level is 6 volts and the threshold voltage level is 5.1 volts (6 volts–0.9 volts).

If the voltage level value is less than a predetermined threshold, then the combined unit 200 checks to see if a paging system is available as indicated by decision block 409. Determining if a paging system is available may be accomplished in one of many different ways. First, if a separate paging device is available, as in the combined unit 200, the paging device may be turned on to determine if a paging system is available. Second, the combined unit 301 may send a request signal to the remote transceiver 315 to determine if the radiotelephone system has a paging mode available.

If a paging system is available, then the combined unit checks to see if operation as a paging device has been allowed by the combined unit as indicated at decision block 411. The allowance of operation as a paging device may be an option available on the combined unit, or it may depend if the paging device 105 is currently available in the combined unit 200.

If the paging operation is allowed, then the combined unit requests from the remote transceiver to operate as a paging device, as indicated at function block 415. After the request, the combined unit waits to receive an acknowledge signal from the remote transceiver for a predetermined time period.

The predetermined time is set to a time equal to or greater than the time for combined unit to send a request signal to the remote transceiver, the remote transceiver to process the request signal, and the remote transceiver to return an acknowledge signal to the combined unit. In the preferred embodiment, the predetermined time is 5 seconds. If the acknowledge signal is received from the remote transceiver, then the combined unit operates as a paging device as indicated by function block 421.

If the acknowledge signal is not received by the combined unit within the predetermined time period, then the combined unit sends an additional request signal to the remote transceiver as indicated by decision block 419. In the preferred embodiment, if three attempts have been made and no acknowledge signal has been received by the combined unit 200, then the combined unit 200 alerts the user that the battery voltage is low as indicated at function block 413. The number of attempts made are not critical to the invention and may be adjusted according to the needs of the individual system Additionally, the combined unit defaults to low battery voltage indication if there is no paging system available or if the paging operation is not allowed.

FIG. 5 is a process flow chart illustrating a second method of operating a combined unit such as combined unit 200 of FIG. 2. This method may be implemented in a combined unit independent or in conjunction with the methods of FIG. 4 and FIG. 5.

First, the combined unit operates as a radiotelephone as indicated by function block 503. Second, a method monitors the quality of the communication channel 115 as indicated by function block 505. The quality of the communication channel 115 may be monitored in one of many ways including: monitoring the received signal strength indicator (RSSI) or monitoring the envelope detector or any combination thereof.

Third, the quality of the communication channel 115 is compared to a predetermined threshold as indicated by decision block 507. The RSSI can indicate poor channel quality during a hand-off or due to multi-path distortion. To avoid switching between the radiotelephone operation and the paging operation due to instantaneous poor channel quality, the channel quality should be averaged over a period of time. The averaging will help identify a true loss of the communication channel 115 between the combination unit and the remote transceiver. In the preferred embodiment, the test of the communication channel quality is averaged over 30 seconds for this purpose.

If the quality indicator is less than the threshold, then the combined unit 200 determines if a paging system is available, as indicated by decision block 509 and previously discussed.

If a paging system is available, then the combined unit 200 checks to see if the paging operation has been selected by the user of the combined unit 200, as indicated at decision block 511. If the paging operation has been allowed, then the combined unit 200 sends a request signal to the remote transceiver 109, requesting to operate as a paging device as indicated by function block 513. Next, method waits to receive an acknowledge signal from the remote transceiver 109. If the acknowledge signal is received from the remote transceiver 109 within a first predetermined time period, then the combined unit operates as a paging device as indicated by function block 519. If no acknowledge signal has been received from the remote transceiver 109 within the predetermined time period, then a second request signal is sent from the combined unit 200 to the remote transceiver 109. If after three attempts no acknowledge signal has been received from the remote transceiver 109, then the combined unit 200 remains operating as a radiotelephone as indicated at decision block 517. The number of attempts made are not critical to the invention and may be adjusted according to the needs of the individual system. Additionally, if the quality indication is greater than the predetermined threshold or the paging system is not available, or the paging operation is not allowed by the user, then the combined unit remains operating as a radiotelephone.

Continuous switching the combined unit 200 between the paging operation and the radiotelephone operation is undesirable. To avoid this situation, the following precautions can be taken. First, switching back to radiotelephone operation is not allowed until at least 1 minute after switching to the paging operation, this time is not critical to the present invention and may be adjusted according to the needs of a specific system. Second, the channel quality should be averaged over a period of time. The averaging will help identify a true loss of the communication channel 115 between the combination unit and the remote transceiver. In the preferred embodiment, the test of the communication channel quality is averaged over 30 seconds for this purpose. Third, use a RSSI hysteresis to control the switching. The RSSI hysteresis in the preferred embodiment sets the threshold for switching from the radiotelephone operation and to the paging operation to 10 dB$\mu$. The threshold for switching from the paging operation and to the radiotelephone operation to 15 dB$\mu$. The actual switching thresholds may be altered for specific applications. In general, the threshold for switching from the radiotelephone operation to the paging operation should be lower than switching from the paging operation to the radiotelephone operation.

Figure 6:
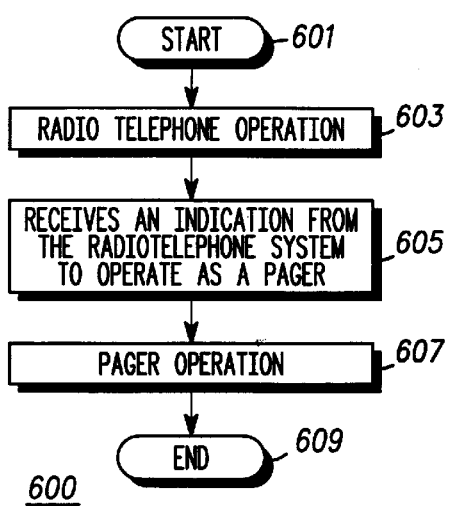
FIG. 6 is a process flow chart illustrating a method of operating the combined unit in accordance with the present invention.

FIG. 6 is a process flow chart illustrating a third method of operating a combined unit such as combined unit 200 of FIG. 2. This method may be implemented in a combined unit independent or in conjunction with the methods of FIG. 4 and FIG. 5. First, the combined unit 200 operates as a radiotelephone as indicated by function block 603. Second, the combined unit 200 receives a signal from the remote transceiver 109 requesting operation as a paging device as indicated at function block 605. Third, the combined unit switches operation from a radiotelephone to a paging unit as indicated by function block 607.

Alternatively, the radiotelephone 100 may be operated in the radiotelephone system 100 as follows: First, comparing the first operating parameter, such as RSSI or battery voltage level to a first predetermined threshold. Second, requesting, responsive to the first operating parameter less than the first predetermined threshold, operation of the radiotelephone in the first operating mode from the first remote transceiver. Third, requesting, responsive to the first operating parameter greater than the first predetermined threshold, operation of the radiotelephone in the second operating mode from the first remote receiver. Fourth, receiving an acknowledge signal acknowledging the first or the second step of requesting within a first predetermined time period from the first remote transceiver. Fifth, operating, responsive to the step of receiving, the radiotelephone in the first or the second operating mode.

What is claimed is:

1. A method of controlling operation of a communication device, the communication device including a controller, the controller to switchably operate the communication device in one of a telephone mode and a pager mode, the telephone mode for providing two-way communications, the pager mode for providing one-way communications to the communication device, the method comprising the steps of:

operating in the telephone mode;

detecting a channel quality of a communication channel to be below a first predetermined threshold, the channel quality including a measurement of a quality of a received signal, wherein the channel quality is based on an average quality over a first predetermined time period;

requesting, to the remote transceiver and responsive to said step of detecting, to operate in the pager mode;

receiving, from the remote transceiver, an acknowledge signal within a second predetermined time period; and operating, responsive to said step of receiving, in the pager mode.

2. A method of operating a communication device in accordance with claim 1 wherein said step of detecting further comprises detecting a battery voltage to be below a second predetermined threshold.

3. A method of operating a communication device in accordance with claim 1 wherein said step of detecting further comprises detecting a received signal strength of the communication channel.

4. A method of operating a communication device in accordance with claim 1 further comprising the intermediate step of determining if the pager mode is available.

5. A method of operating a communication device in accordance with claim 4 wherein the communication device further includes a user interface, and the method further comprises the step of alerting, via the user interface, when the channel quality is below the first predetermined threshold and the pager mode is determined to be unavailable.

6. A method of operating a radiotelephone, the radiotelephone for use in a radiotelephone system, the radiotelephone system including a remote transceiver, the radiotelephone having a user interface, at least one receiver, and a transmitter, the radiotelephone to operate in one of a telephone mode and a pager mode, the telephone mode for providing two-way communications, the pager mode for providing one-way communications to the radiotelephone, the method comprising the steps of:

comparing a channel quality of a communication channel to a first predetermined threshold, the channel quality including a measurement of a quality of a received signal, wherein the channel quality is based on an average quality over a first predetermined time period;

requesting, via the transmitter and responsive to the channel quality being less than the first predetermined threshold, operation of the radiotelephone in the pager mode;

requesting, via the transmitter and responsive to the channel quality being greater than the first predetermined threshold, operation of the radiotelephone in the telephone mode;

receiving, via the at least one receiver, an acknowledge signal within a second predetermined time period, the acknowledge signal acknowledging one of the first and the second steps of requesting; and operating, responsive to the step of receiving, the radiotelephone in one of the telephone mode and the pager mode.

7. A method of operating a radiotelephone in accordance with claim 6 further comprising the intermediate step of determining if the pager mode is available.

8. A method of operating a radiotelephone in accordance with claim 7 further comprising the step of alerting, via the user interface and responsive to determining that said pager mode is unavailable, that the channel quality is below said first predetermined threshold.

9. A method of operating a radiotelephone in accordance with claim 6 wherein the channel quality includes a received signal strength of the radiotelephone.

10. A method of operating a communication device, the communication device including a radiotelephone circuit, the method comprising the steps of:

enabling the radiotelephone circuit for operation;

monitoring a channel quality of a communication channel, the channel quality including a measurement of a quality of a received signal, wherein the channel quality is based on an average quality over a first predetermined time period;

determining if the channel quality is below a first predetermined threshold;

determining if a pager option in the communication device is available; and disabling the radiotelephone circuit from operation in response to both the channel quality being below the first predetermined threshold and the pager option being available.

11. The method according to claim 10
wherein the step of monitoring includes the step of monitoring a battery voltage of the communication device, wherein the step of determining includes the step of determining if the battery voltage is below a second predetermined threshold, and wherein the step of disabling includes the step of disabling the radiotelephone circuit in response to the battery voltage being below the second predetermined threshold and the pager option being available.

12. The method according to claim 10 wherein the communication device is designed to accommodate a removable pager device, and wherein the step of determining if the pager option is available further includes the step of determining if the communication device includes the removable pager device.

13. The method according to claim 10 wherein the communication device further includes a paging circuit and the method further comprises the step of:

enabling the paging circuit for operation in response to the channel quality being below the first predetermined threshold and the pager option being available.

14. The method according to claim 10 wherein the communication device further includes a user interface and the method further comprises the step of:

alerting, via the user interface, in response to both the channel quality being below the first predetermined threshold and the pager option being unavailable.

15. A method of operating a communication device, the communication device to operate in one of a radiotelephone mode and a paging mode, the method comprising the steps of:

monitoring a battery voltage of the communication device;

comparing the battery voltage to a first threshold;

monitoring a signal reception quality of the communication device, the signal reception quality including a measurement of a quality of a received signal, wherein the signal reception quality is based on an average signal quality over a first predetermined time period;

comparing the signal reception quality to a second threshold;

operating in the radiotelephone mode in response to both the battery voltage being greater than the first threshold and the signal reception quality being greater than the second threshold; and operating in the paging mode in response to at least one of the battery voltage being below the first threshold and the signal reception quality being below the second threshold.

16. A communication device, comprising:

a receiver, said receiver to receive radio frequency (RF) signals from a remote radiotelephone transceiver, said receiver to detect a channel quality including a reception quality of the RF signals;

a transmitter; and a controller, said controller coupled to said receiver and said transmitter and switchably operating said communication device in one of a pager operating mode and a radiotelephone operating mode, said controller to switch said communication device from the pager operating mode to the radiotelephone operating mode in response to the channel quality being above a first threshold, said controller to switch said communication device from the radiotelephone operating mode to the pager operating mode in response to the channel quality being below a second threshold, said controller also able to switch between the radiotelephone operating mode and the pager operating mode in response to external commands from a remote transceiver.

17. The communication device according to claim 16, wherein the first threshold is greater than or equal to the second threshold.

18. The communication device according to claim 16, further comprising:

a removable pager device, said removable pager device removably coupled to said controller, said removable pager device providing the pager operating mode for said communication device, wherein said controller is to switch said communication device from the radiotelephone operating mode to the pager operating mode in response to both the channel quality being below the threshold and the removable pager device being available.

19. The communication device according to claim 16, wherein the channel quality is based on an average channel quality obtained over a predetermined time period.

20. The communication device according to claim 16, wherein the channel quality is based on more than one channel quality obtained over a predetermined time period.

21. A communication device, comprising:

at least one receiver, said at least one receiver to receive radio frequency (RF) signals and to detect a signal quality of the RF signals;

a transmitter; and a controller, said controller coupled to a battery source providing a voltage, said controller coupled to said at least one receiver and said transmitter and switchably operating said communication device in one of a radiotelephone operating mode and a pager operating mode, said controller to switch said communication device from the pager operating mode to the radiotelephone operating mode in response to both the voltage being above a first threshold and the signal quality being above a second threshold, said controller to switch said communication device from the radiotelephone operating mode to the pager operating mode in response to at least one of the voltage being below the first threshold and the signal quality being below the second threshold.

22. The communication device according to claim 21, further comprising:

a removable pager device, said removable pager device removably coupled to said controller, said removable pager device providing the pager operating mode for said communication device.

23. The communication device according to claim 21, wherein the channel quality is based on an average signal quality obtained over a predetermined time period.

24. The communication device according to claim 21, wherein the channel quality is based on more than one signal quality obtained over a predetermined time period.

* * * * *